US011377063B2

(12) United States Patent
Lind et al.

(10) Patent No.: US 11,377,063 B2
(45) Date of Patent: Jul. 5, 2022

(54) AIRBAG FOR VEHICLE OCCUPANT RESTRAINT SYSTEM

(71) Applicants: TRW Automotive Safety Systems GmbH, Aschaffenburg (DE); Dalphi Metal Espana S.A., Vigo (ES); Safelife industria de Componentes de Seguranca Automovel S.A., Gemieira (PT)

(72) Inventors: Thomas Lind, Rieneck (DE); Stefan Sapountzis, Erlenbach a. Main (DE); Ramon Bana Castro, Vigo (ES); Bartolomeu Franco, Viana do Castelo (PT); Alexandra Baibas Calvo, Vigo (ES); Diogo Goncalves Rocha, Viana do Castelo (PT)

(73) Assignees: DALPHI METAL ESPANA S.A., Vigo (ES); SAFELIFE INDUSTRIAL DE COMPOMENTES DE SEGURANCA AUTOMOVEL S.A., Gremieira (PT); TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 50 days.

(21) Appl. No.: 16/600,620

(22) Filed: Oct. 14, 2019

(65) Prior Publication Data
US 2020/0130635 A1    Apr. 30, 2020

(30) Foreign Application Priority Data
Oct. 30, 2018    (DE) .................... 20 2018 106 208.5

(51) Int. Cl.
*B60R 21/2338*    (2011.01)
*B60R 21/203*    (2006.01)

(52) U.S. Cl.
CPC ........ *B60R 21/2338* (2013.01); *B60R 21/203* (2013.01); *B60R 2021/23384* (2013.01)

(58) Field of Classification Search
CPC ........... B60R 2021/23382; B60R 2021/23384; B60R 2021/2395; B60R 21/203; B60R 21/2338; B60R 21/2342; B60R 21/239
See application file for complete search history.

(56) References Cited

U.S. PATENT DOCUMENTS 6,832,778 B2 * 12/2004 Pinsenschaum ...... B60R 21/239
   280/739
7,726,685 B2 *  6/2010 Abe .................... B60R 21/233
   280/736

(Continued)

FOREIGN PATENT DOCUMENTS

DE    102006027371    12/2007
DE    102007058656    6/2009

*Primary Examiner* — Laura Freedman
(74) *Attorney, Agent, or Firm* — Tarolli, Sundheim, Covell & Tummino LLP

(57) ABSTRACT

The invention relates to an airbag for a vehicle occupant restraint system, comprising an airbag panel (16) defining an inflatable airbag volume as well as including a front panel portion (18) and a rear panel portion (20), a tether (22) extending in the interior of the airbag (14) across the inflatable airbag volume, a discharge orifice (24) which is formed in the rear panel portion (20) of the airbag panel (16), as well as a first closing tab (26) and a second closing tab (28) for closing the discharge orifice (24), wherein the tether (22) extends from a first tether end (32) tightly connected to the front panel portion (18) in the direction of the discharge orifice (24) to an opposite second tether end (34), wherein the first closing tab (26) extends from a first tab end (36) tightly connected to the rear panel portion (20) to a second tab end (38) tightly connected to the second tether end (34), wherein the second closing tab (28) is fastened on the rear (Continued)

panel portion (20) adjacent to the discharge orifice (24), and wherein the two closing tabs (26, 28) are coupled by a connection releasable when a vehicle occupant (30) impacts on the inflated airbag (10).

10 Claims, 3 Drawing Sheets

(56) References Cited

U.S. PATENT DOCUMENTS

| | | | |
|---|---|---|---|
| 7,931,297 B2 * | 4/2011 | Abe | B60R 21/2338 |
| | | | 280/739 |
| 8,020,891 B2 * | 9/2011 | Fukawatase | B60R 21/239 |
| | | | 280/739 |
| 9,180,836 B2 * | 11/2015 | Hotta | B60R 21/207 |
| 9,352,720 B2 * | 5/2016 | Jang | B60R 21/239 |
| 9,428,141 B2 * | 8/2016 | Kwon | B60R 21/216 |
| 10,029,645 B2 * | 7/2018 | Aranzulla | B60R 21/276 |
| 10,647,287 B2 * | 5/2020 | Komatsu | B60R 21/2338 |
| 11,130,468 B2 * | 9/2021 | Baba | B60R 21/2338 |
| 2002/0175511 A1 | 11/2002 | Dunkle et al. | |
| 2006/0071462 A1 | 4/2006 | Smith et al. | |
| 2007/0013177 A1 | 1/2007 | Abe | |
| 2010/0001495 A1 | 1/2010 | Sekino et al. | |
| 2010/0032931 A1 | 2/2010 | Kumagai et al. | |
| 2013/0147169 A1 | 6/2013 | Boyle, III | |
| 2014/0300094 A1 | 10/2014 | Williams | |
| 2015/0375711 A1 | 12/2015 | Umehara et al. | |

* cited by examiner

AIRBAG FOR VEHICLE OCCUPANT RESTRAINT SYSTEM

RELATED APPLICATION

This application claims priority from German Application No. 10 2018 106 208.5, filed Oct. 30, 2018, the subject matter of which is incorporated herein by reference in its entirety.

BACKGROUND OF THE INVENTION

The invention relates to an airbag for a vehicle occupant restraint system, comprising an airbag panel defining an inflatable airbag volume as well as having a front panel portion and a rear panel portion, a tether extending in the interior of the airbag across the inflatable airbag volume, a discharge orifice formed in the rear panel portion of the airbag panel as well as a first closing tab and a second closing tap for closing the discharge orifice, with the tether extending from a first tether end tightly connected to the front panel portion in the direction of the discharge orifice to an opposite second tether end, the first closing tab extending from a first tab end tightly connected to the rear panel portion to a second tab end tightly connected to the second tether end, and the second closing tab being fastened on the rear panel portion adjacent to the discharge orifice.

From prior art airbags are known already which have, apart from permanently open discharge orifices, also adaptive discharge orifices which are selectively opened or at least partially closed in response to predetermined marginal conditions such as e.g. a deployment shape of the airbag and/or a seated position of the vehicle occupant.

DE 10 2015 110 365 A1 illustrates a generic airbag comprising an adaptive discharge orifice which is closed in the completely inflated and deployed condition of the airbag and is opened when the occupant immerses into the airbag. In this case, the adaptive discharge orifice is "passively" adapted, especially exclusively as a result of an airbag deformation by the vehicle occupant. An electric, pyrotechnic or other "active" control device for opening and/or closing the discharge orifice is not required, which helps to reduce the manufacturing expenditure and the complexity of the vehicle occupant restraint system.

If the vehicle occupant rebounds after immersing into the airbag, the adaptive discharge orifice according to DE 10 2015 110 365 A1 is closed again. However, there are situations in which said re-closing of the discharge orifice is undesired and a continuously open discharge orifice would be beneficial to occupant restraint.

SUMMARY OF THE INVENTION

Therefore, it is the object of the invention to provide an airbag of a most simple constructional design comprising a passively controllable adaptive discharge orifice which after release thereof is irreversibly retained in the opened position.

In accordance with the invention, this object is achieved by an airbag of the type mentioned in the beginning in which the two closing tabs are coupled by a connection that is releasable when a vehicle occupant impacts on the inflated airbag.

Prior to the vehicle occupant impacting on the front panel portion of the inflated airbag, the closing tabs are fastened to each other by the releasable connection so that the adaptive discharge orifice of the airbag is substantially closed. When the vehicle occupant impacts on and immerses into the inflated airbag, the releasable connection is disconnected and the discharge orifice is released. This (irreversible) disconnection of the releasable connection thus ensures with little constructional effort that the discharge orifice remains released and will not be closed again even if the vehicle occupant rebounds. The discharge orifice being closed at the beginning of airbag deployment provides for the airbag to have a long holding time, i.e. to retain an internal pressure sufficient for occupant restraint for a relatively long time. The irreversible release of the discharge orifice then enables the vehicle occupant to immerse in a controlled manner as well as an altogether advantageous occupant restraint. In this way, the described airbag is suited especially also for use in vehicles with automated or autonomous driving mode.

Preferably, the releasable connection between the two closing tabs is in the form of a tear seam. In a tear seam a desired limit load, i.e. a load at which the seam will tear, can be adjusted very precisely with little effort. Moreover, tear seams can be quickly and easily produced.

The tear seam preferably includes two linear seam portions which extend arrow-like away from each other starting from a joint seam tip at an angle, especially at an acute angle, to a respective free seam portion end. Said arrow shape of the tear seam entails, under load, a concentration of tension at the seam tip so that a defined and easily reproducible tearing behavior is resulting.

According to one embodiment of the airbag, the closing tabs extend from the interior of the airbag through the discharge orifice to the outside of the airbag, with the first tab ends of the two closing tabs being fastened, especially (tightly) stitched, from outside on the rear panel portion of the airbag panel. The first tab ends may contact each other or even overlap each other so that the closing tabs completely enclose the discharge orifice in the area of the first tab ends.

In this embodiment, when the airbag is completely inflated, the two closing tabs may extend in the interior of the airbag transversely to the airbag panel and outside the airbag in parallel to the airbag panel as well as especially in opposite directions so that, in the area of the discharge orifice, a deflection of the closing tabs and thus a fold is formed, wherein the tear seam is configured in a closing tab portion extending transversely to the airbag panel.

If the tear seam is arrow-shaped, the seam tip in this case preferably abuts on the fold, and the linear seam portions extend starting from the seam tip toward the front panel portion. In this way, the tear seam is undone already immediately after the vehicle occupant's impacting on the inflated airbag and thus very rapidly provides for a desired irreversible release of the discharge orifice.

According to another embodiment of the airbag, the tether and the first closing tab may be integrally formed.

The invention further comprises a steering wheel assembly including a vehicle steering wheel that is rotatable about a steering axle and an airbag module that includes the afore-described airbag. The airbag in this case is mounted as driver airbag in the area of the steering wheel hub and, in the event of crash, can advantageously protect the driver of the vehicle.

BRIEF DESCRIPTION OF THE DRAWINGS

Further features and advantages of the invention will be evident from the subclaims as well as from the following description of preferred embodiments with reference to the drawings, wherein:

DESCRIPTION

Figure 1:
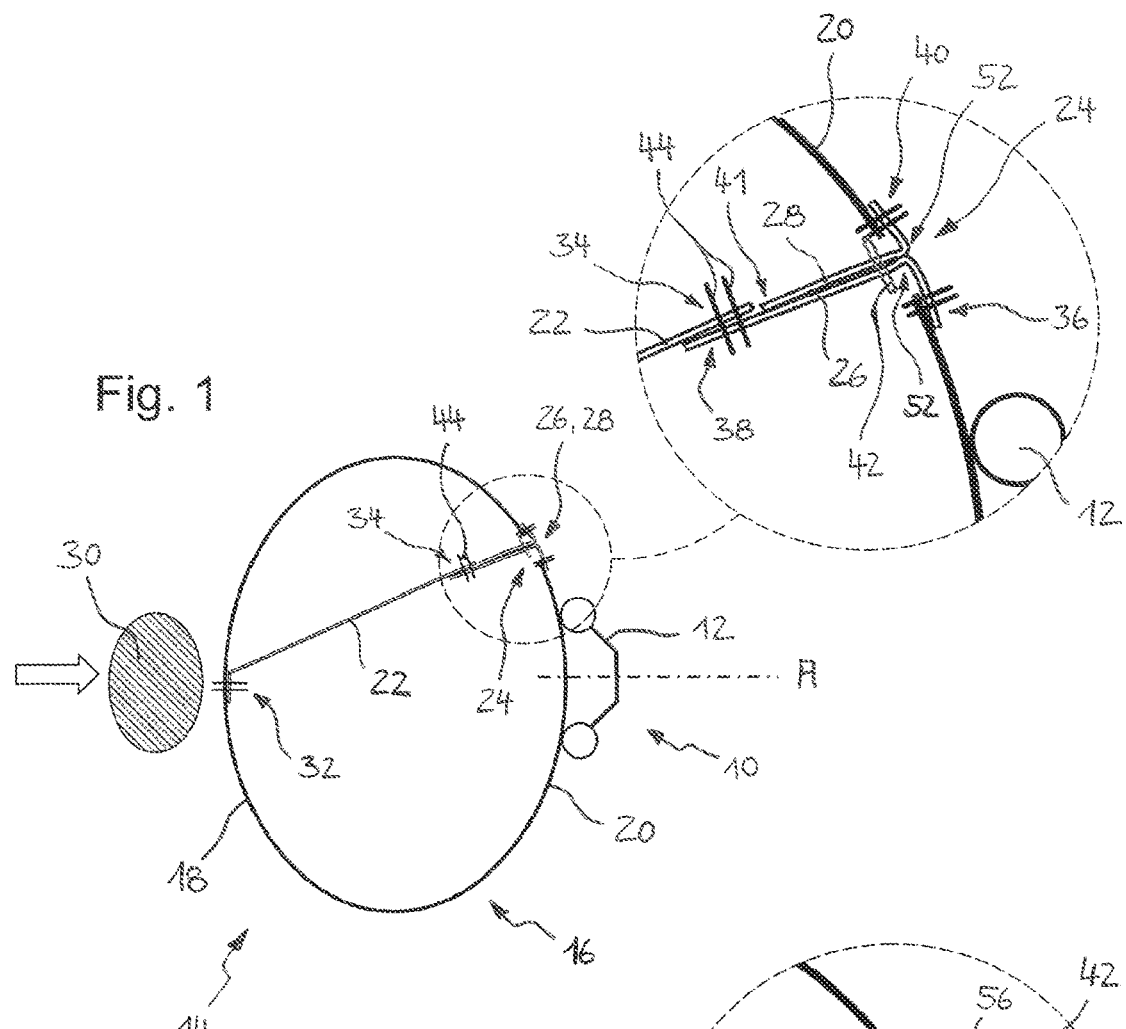
FIG. 1 shows a schematic section across an airbag according to the invention in the inflated condition before a vehicle occupant's impact.

FIGS. 1 to 4 illustrate a steering wheel assembly 10 comprising a vehicle steering wheel 12 which is rotatable about a steering axle A as well as an airbag module which is mounted in the area of a steering wheel hub and includes an airbag 14 for a vehicle occupant restraint system.

The airbag 14 comprises an airbag panel 16 defining an inflatable airbag volume as well as including a front panel portion 18 and a rear panel portion 20, a tether 22 extending in the interior of the airbag 14 across the inflatable airbag volume, a discharge orifice 24 formed in the rear panel portion 20 of the airbag panel 16 as well as a first closing tab 26 and a second closing tab 28 for closing the discharge orifice 24. In this context, a portion of the airbag panel 16 facing a vehicle occupant 30 in the inflated condition of the airbag 14 is referred to as the front panel portion 18, wherein in FIGS. 1 to 4 merely the head of the vehicle occupant 30 is schematically indicated. Accordingly, the rear panel portion 20 is a portion of the airbag panel 16 opposed to the front panel portion 18 and being remote from the vehicle occupant 30.

The tether 22 in the inflated condition of the airbag 14 extends from a first tether end 32 tightly connected, especially stitched, to the front panel portion 18 toward the discharge orifice 24 up to an opposite second tether end 34.

The first closing tab 26 extends from a first tab end 36 tightly connected, especially stitched, to the rear panel portion 20 to a second tab end 38 tightly connected, especially stitched, to the second tether end 34.

Analogously to the first closing tab 26, a first tab end 40 of the second closing tab 28 is fastened, especially stitched, to the rear panel portion 20 adjacent to the discharge orifice 24.

Moreover, the two closing tabs 26, 28 are coupled by a connection releasable upon the vehicle occupant 30 impacting on the inflated airbag 14, said releasable connection being especially designed as tear seam 42. The closing tabs 26, 28 are preferably made from a tissue, wherein said tissue may be especially identical to a tissue used for the airbag panel 16.

Figure 5:
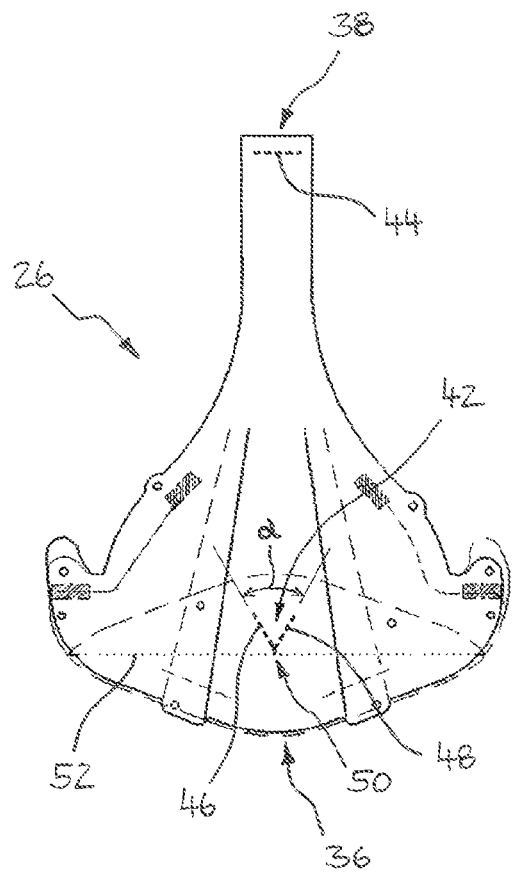
FIG. 5 shows a detail view of a closing tab of the airbag according to FIG. 1.

FIG. 5 illustrates a detail view of the first closing tab 26, wherein at the second tab end 38 a seam 44 is indicated through which the first closing tab 26 in the mounted condition is tightly connected to the tether 22.

Furthermore, the tear seam 42 is shown which fixes the two closing tabs 26, 28 to each other before the vehicle occupant 30 immerses into the inflated airbag 14. According to FIG. 5, the tear seam 42 includes two linear seam portions 46, 48 extending away from each other in arrow shape starting from a joint seam tip 50 at an angle α, especially at an acute angle α, to a respective free seam portion end.

The second closing tab 28 may be substantially identical to the first closing tab 26, wherein the second closing tab 28 is not connected to the tether 22 at its second tab end 41, however.

In accordance with FIGS. 1 to 4, the two closing tabs 26, 28 extend from the interior of the airbag 14 through the discharge orifice 24 to the outside of the airbag 14, with the first tab ends 36, 40 of the two closing tabs 26, 28 being fastened, especially stitched, on opposed sides of the discharge orifice 24 from outside to the rear panel portion 20 of the airbag panel 16. The first tab ends 36, 40, when viewed in the circumferential direction of the discharge orifice 24, may contact or overlap each other so that the closing tabs 26, 28 completely enclose the discharge orifice 24 in the area of their first tab ends 36, 40.

FIG. 1 illustrates the deployed and completely inflated airbag 14, before the vehicle occupant 30 impacts on the front panel portion 18 of the airbag panel 16. Accordingly, the two closing tabs 26, 28 extend in the interior of the airbag 14 transversely to the airbag panel 16 and outside the airbag 14 in parallel to the airbag panel 16 in opposite directions. The closing tabs 26, 28 consequently are deflected in the area of the discharge orifice 24 so that a fold 52 is formed, with the tear seam 42 being configured in a closing tab portion extending transversely to the airbag panel 16. In this closing tab portion, the two closing tabs 26, 28 are adjacent to each other and are loaded with an internal airbag pressure merely in a longitudinal direction of the closing tabs, viz. transversely to the airbag panel 16. Consequently, the tear seam 42 is largely unloaded and fixes the two closing tabs 26, 28 to each other.

Figure 2:
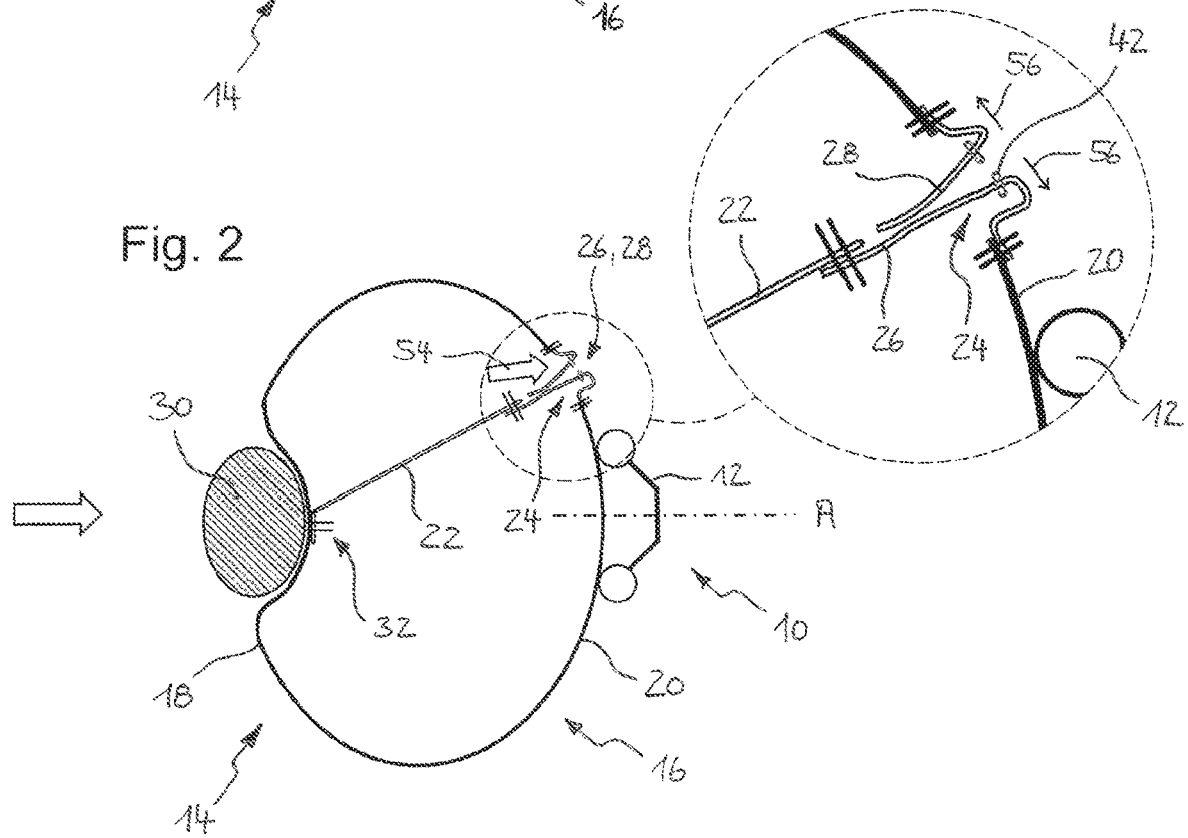
FIG. 2 shows a schematic section across the airbag according to FIG. 1 when the vehicle occupant is impacting.

FIG. 2 illustrates a situation when the vehicle occupant 30 immerses into the airbag 14. The front panel portion 18 of the airbag panel 16 is deformed so that the first tether end 32 will move in the direction of the discharge orifice 24 and tensile stress within the tether 22 will subside. Due to the application of internal pressure in the area of the discharge orifice 24 (see arrow 54), the closing tabs 26, 28 move outwardly through the discharge orifice 24 and at least partially release a gas flow through the discharge orifice 24. While moving outwardly, the closing tabs 26, 28 are loaded away from each other in the area of the tear seam 42 transversely to the longitudinal direction of the closing tabs (cf. arrows 56) so that the tear seam 42 is strained beyond its limit load and will tear.

Figure 3:
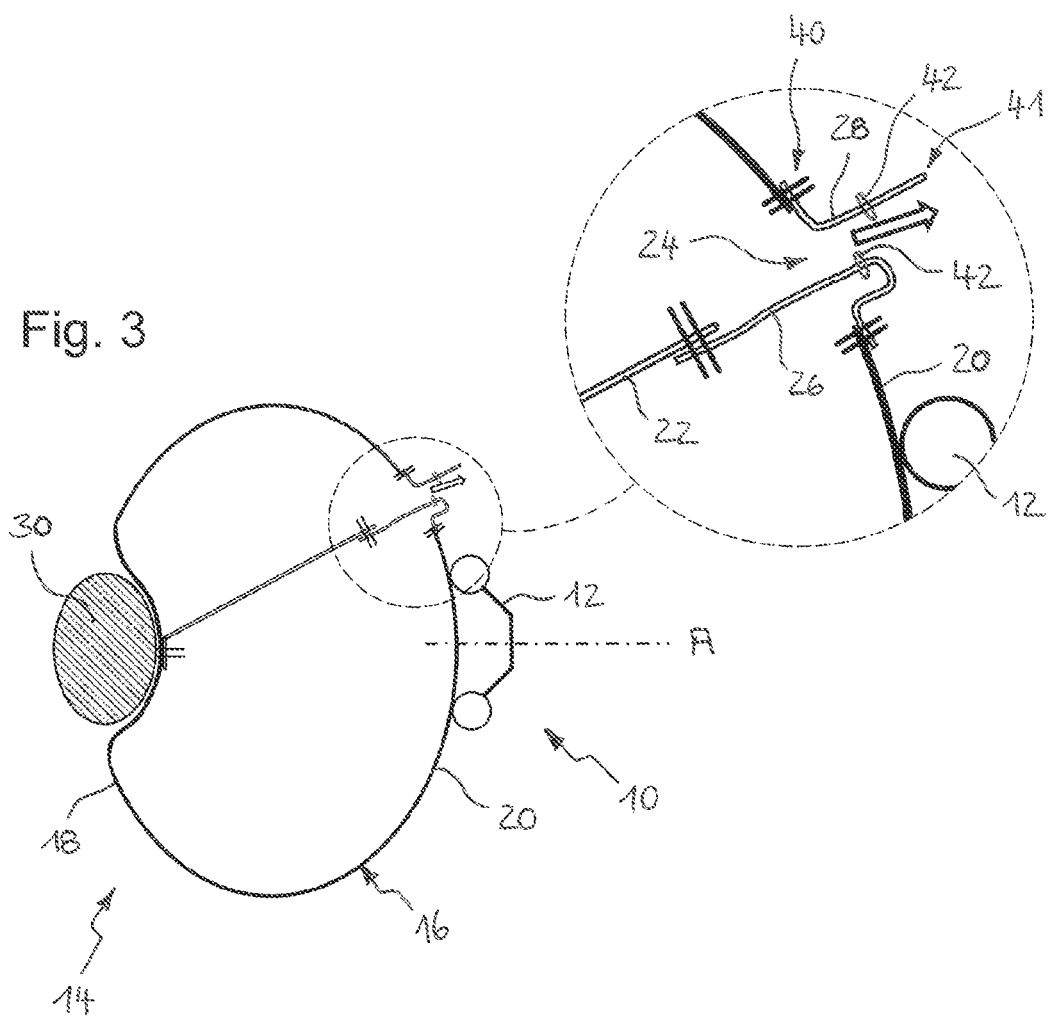
FIG. 3 shows a schematic section across the airbag according to FIG. 1 after the vehicle occupant's impact.

After immersion of the vehicle occupant 30 and tearing of the tear seam 42, the second closing tab 28 is urged out of the airbag 14 by the gas flow until it is completely outside the airbag 14, as shown in FIG. 3. The second closing tab 28 is retained on the airbag panel 16 merely by the fastening of the first tab end 40 and at this position does not prevent gas from flowing out of the airbag 14 through the discharge orifice 24.

Figure 4:
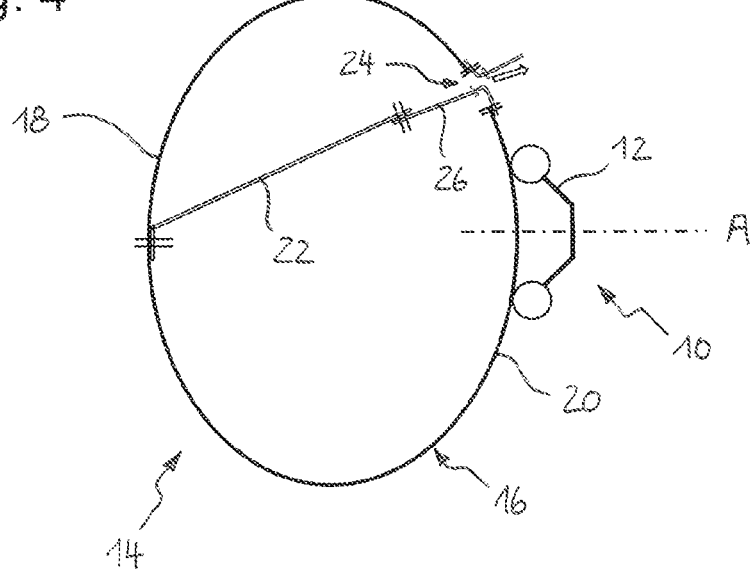
FIG. 4 shows another schematic section across the airbag according to FIG. 1 after the vehicle occupant's impact.

According to FIG. 4, the discharge orifice 24 remains open even if the vehicle occupant 30 rebounds after immersing into the airbag 14 and thus removes from the rear panel portion 20 of the airbag 14 again.

Consequently, the airbag 14 includes a discharge orifice 24 which is advantageously irreversibly opened when the vehicle occupant 30 immerses.

An airbag 14 of this type is especially suited for use in vehicles with an automated or autonomous driving mode. Compared to a manual driving mode, the vehicle occupant 30 in the automated or autonomous driving mode is frequently spaced further apart from the vehicle steering wheel 12, for example because the vehicle occupant 30 has adopted a relaxed, reclined seated position and/or the vehicle steering wheel 12 has been moved away from the vehicle occupant 30 to give him/her more free space. Correspondingly, in the event of vehicle collision, the vehicle occupant 30 impacts relatively late on the airbag 14, thus causing an internal airbag pressure to be already undesirably low, especially when permanently open gas flow orifices are provided in the airbag 14. In the airbag design according to FIGS. 1 to 4, the discharge orifice 24 is closed by the closing tabs 26, 28 at the beginning of airbag deployment, however, so that the airbag 14 maintains an internal pressure sufficient for occupant restraint for a comparatively long time. Not before the impact of the vehicle occupant 30 will the discharge orifice 24 be released, with the irreversible release of the discharge orifice 24 allowing for controlled dampened immersion of the vehicle occupant 30 and, on the whole, ensuring advantageous occupant restraint comparable to permanently open gas flow orifices.

From FIG. 5 it becomes evident that the V-shaped or arrow-shaped tear seam 42 in the shown example embodiment is arranged so that the seam tip 50 abuts on the fold 52 and the linear seam portions 46, 48 extend from the seam tip 50 toward the front panel portion 18. In FIG. 5, the fold 52 at which the first closing tab 26 according to FIG. 1 is deflected from a direction transversely to the airbag panel 16 to a direction parallel to the airbag panel 16 is indicated by a dotted line and the first tab end 36 of the first closing tab 26 folded over at the fold 52 is indicated by a broken line.

Figure 6:
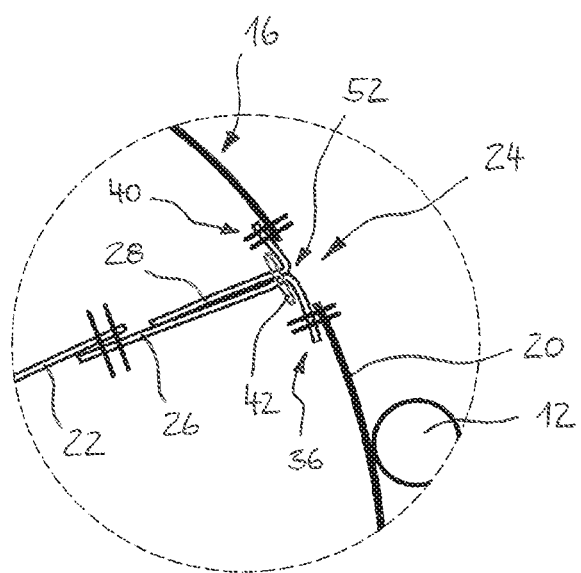
FIG. 6 shows a schematic detail section across an airbag according to the invention as set forth in another embodiment.

FIG. 6 illustrates another embodiment of the airbag 14 which differs from the embodiment according to FIGS. 1 to 5 merely by the fact that the first tab ends 36, 40 of the two closing tabs 26, 28 are fastened, especially stitched, from inside rather than from outside to the rear panel portion 20 of the airbag panel 16 on opposite sides of the discharge orifice 24. As regards the general design and function of the airbag 14, therefore the foregoing description is referred to.

Analogously to the embodiment according to FIGS. 1 to 5, when the airbag 14 is completely inflated, the two closing tabs 26, 28 extend toward each other starting from the first tab ends 36, 40 substantially in parallel to the airbag panel 16, contact each other in the area of the discharge orifice 24 and then extend transversely to the airbag panel 16 while forming the fold 52, wherein the tear seam 42 abuts on the fold 52 and is formed in a closing tab portion which extends transversely to the airbag panel 16.

In this embodiment, too, the tear seam 42 preferably includes two linear seam portions 46, 48 which extend away from each other in arrow shape starting from a joint seam tip 50 at an angle α to a respective free seam portion end (see FIG. 5). The seam tip 50 abuts on the fold 52, and the linear seam portions 46, 48 extend from the seam tip 50 in the direction of the front panel portion 18.

Although in FIGS. 1 through 6 only a driver airbag for assembly within the vehicle steering wheel 12 is illustrated, the airbag 14 may also be a different airbag, for example a passenger airbag, as a matter of course.

The invention claimed is:

1. An airbag for a vehicle occupant restraint system, comprising:
 an airbag panel (16) defining an inflatable airbag volume and including a front panel portion (18) and a rear panel portion (20),
 a tether (22) extending in the interior of the airbag (14) across the inflatable airbag volume,
 a discharge orifice (24) formed in the rear panel portion (20) of the airbag panel (16), as well as
 a first closing tab (26) and a second closing tab (28) for closing the discharge orifice (24), wherein the tether (22) extends from a first tether end (32) tightly connected to the front panel portion (18) in the direction of the discharge orifice (24) to an opposed second tether end (34), wherein the first closing tab (26) extends from a first tab end (36) tightly connected to the rear panel portion (20) to a second tab end (38) tightly connected to the second tether end (34), and wherein the second closing tab (28) is fastened adjacent to the discharge orifice (24) on the rear panel portion (20), wherein the two closing tabs (26, 28) are coupled by a connection that couples the closing tabs (26, 28) together in a fluid-tight manner to close the discharge orifice prior to inflation of the airbag and which is configured to be released in response to a vehicle occupant (30) impacting on the inflated airbag (10) in order to open the discharge orifice and vent inflation fluid from the airbag volume.

2. The airbag according to claim 1, wherein the releasable connection between the two closing tabs (26, 28) is in the form of a tear seam (42).

3. The airbag according to claim 2, wherein the tear seam (42) includes two linear seam portions (46, 48) which extend away from each other at an angle (α) in arrow shape starting from a joint seam tip (50) to a respective free seam portion end.

4. The airbag according to claim 3, wherein when the airbag (10) is completely inflated, the two closing tabs (26, 28) extend in the interior of the airbag (14) transversely to the airbag panel (16) and outside the airbag (10) in parallel to the airbag panel (16) so that in the area of the discharge orifice (24) a fold (52) is formed, wherein the tear seam (42) is configured in a closing tab portion extending transversely to the airbag panel (16).

5. The airbag according to claim 4, wherein the seam tip (50) abuts on the fold (52) and the linear seam portions (46, 48) extend starting from the seam tip (50) in the direction of the front panel portion (18).

6. The airbag according to claim 1, wherein the closing tabs (26, 28) extend from the interior of the airbag (10) through the discharge orifice (24) to the outside of the airbag (10), the second closing tab (28) including a first tab end (40) with the first tab ends (36, 40) of the two closing tabs (26, 28) being fastened from outside on the rear panel portion (20) of the airbag panel (16).

7. The airbag according claim 1, wherein the tether (22) and the first closing tab (26) are integrally formed.

8. A steering wheel assembly comprising a vehicle steering wheel (12) which is rotatable about a steering axis (A) and comprising an airbag module which includes an airbag (14) according to claim 1.

9. An airbag for a vehicle occupant restraint system, comprising:
 an airbag panel (16) defining an inflatable airbag volume and including a front panel portion (18) and a rear panel portion (20),
 a tether (22) extending in the interior of the airbag (14) across the inflatable airbag volume,
 a discharge orifice (24) formed in the rear panel portion (20) of the airbag panel (16), as well as
 a first closing tab (26) and a second closing tab (28) for closing the discharge orifice (24) and extending from the interior of the airbag (10) in the direction of the discharge orifice (24), wherein the tether (22) extends from a first tether end (32) tightly connected to the front panel portion (18) in the direction of the discharge orifice (24) to an opposed second tether end (34), wherein the first closing tab (26) extends from a first tab end (36) tightly connected to the rear panel portion (20) to a second tab end (38) tightly connected to the second tether end (34), and wherein the second closing tab (28) includes a first tab end (40) with the first tab ends (36, 40) of the two closing tabs (26, 28) being fastened on opposite sides of the discharge orifice (24) from inside on the rear panel portion (20) of the airbag panel (16) so that, when the airbag (10) is completely inflated, the two closing tabs (26, 28) extend toward each other starting from the first tab ends (36, 40) substantially in parallel to the airbag panel (16), contact each other in the area of the discharge orifice (24) and then extend transversely to the airbag panel (16) while forming a fold (52), wherein the tear seam (42) abuts on the fold (52) and is formed in a closing tab portion which extends transversely to the airbag panel (16), wherein the two closing tabs (26, 28) are coupled by a connection configured to be released in response to a vehicle occupant (30) impacting on the inflated airbag (10) in order to open the discharge orifice and vent inflation fluid from the airbag volume.

10. The airbag according to claim 9, wherein the tear seam (42) includes two linear seam portions (46, 48) which extend in arrow shape away from each other at an angle ($\alpha$) starting from a joint seam tip (50) to a respective free seam portion end, wherein the seam tip (50) abuts on the fold (52) and the linear seam portions (46, 48) extend starting from the seam tip (50) toward the front panel portion (18).

* * * * *

UNITED STATES PATENT AND TRADEMARK OFFICE
CERTIFICATE OF CORRECTION

PATENT NO. : 11,377,063 B2
APPLICATION NO. : 16/600620
DATED : July 5, 2022
INVENTOR(S) : Lind et al.

Page 1 of 1

It is certified that error appears in the above-identified patent and that said Letters Patent is hereby corrected as shown below:

On the Title Page

Item (72) Inventors:
Reads "Alexandra Baibas Calvo"
Should read --Alexander Balbas Calvo--

Item (73) Assignee:
Reads "SAFELIFE INDUSTRIAL DE COMPOMENTES DE SEGURANCA AUTOMOVEL S.A., Gremieira (PT)"
Should read --SAFELIFE INDUSTRIA DE COMPOMENTES DE SEGURANCA AUTOMOVEL S.A., Gremieira (PT)--

Signed and Sealed this
Eighth Day of November, 2022

Katherine Kelly Vidal
*Director of the United States Patent and Trademark Office*